US011479924B2

(12) United States Patent
Marienfeld et al.

(10) Patent No.: US 11,479,924 B2
(45) Date of Patent: Oct. 25, 2022

(54) MILLABLE, RECYCLABLE, WATERPROOFING, PAVING FABRIC INTERLAYER SYSTEM AND METHOD OF USE

(71) Applicant: Propex Operating Company, LLC, Chattanooga, TN (US)

(72) Inventors: Mark Lee Marienfeld, Williamston, SC (US); Noah John Nichols, Ringgold, GA (US); Gregory Harding Rader, Ringgold, GA (US)

(73) Assignee: PROPEX OPERATING COMPANY, LLC, Chattanooga, TN (US)

( * ) Notice: Subject to any disclaimer, the term of this patent is extended or adjusted under 35 U.S.C. 154(b) by 467 days.

(21) Appl. No.: 16/254,268

(22) Filed: Jan. 22, 2019

(65) Prior Publication Data

US 2019/0226159 A1   Jul. 25, 2019

Related U.S. Application Data

(60) Provisional application No. 62/620,718, filed on Jan. 23, 2018.

(51) Int. Cl.
*E01C 11/16* (2006.01)
*E01C 7/18* (2006.01)
(Continued)

(52) U.S. Cl.
CPC .......... *E01C 11/165* (2013.01); *C08L 95/00* (2013.01); *D04H 13/00* (2013.01); *E01C 7/182* (2013.01);
(Continued)

(58) Field of Classification Search
CPC .... E01C 11/165; E01C 11/182; E01C 11/185; D10B 2505/20; D04H 13/00
See application file for complete search history.

(56) References Cited

U.S. PATENT DOCUMENTS 3,474,625 A † 10/1969 Draper
4,362,780 A * 12/1982 Marzocchi .............. E01C 3/006
404/17
(Continued)

FOREIGN PATENT DOCUMENTS

EP 0145687 A2 6/1985
EP 0343404 A2 11/1989
(Continued)

OTHER PUBLICATIONS

TenCate Mirafi®, TruPave® Engineered Paving Mat, Nonwoven Pavement Interlayer, 2 pages, 2012.†

(Continued)

*Primary Examiner* — Abigail A Risic
(74) *Attorney, Agent, or Firm* — Husch Blackwell LLP

(57) ABSTRACT

A millable, recyclable, paving fabric interlayer system for the construction and repair of roadways and other load-bearing surfaces and method of using such a fabric is disclosed. The paving fabric includes thermoplastic materials and is combined with asphalt cement to provide a flexible, stress relieving, waterproofing layer for roadways. Because of the thickness and asphalt cement absorption of the fabric, the system provides a stress absorbing interlayer to resist fatigue and reflective cracking in pavements. The system also acts as an effective moisture barrier due to the enhanced capability to retain sufficient asphalt cement when paved onto a roadway. Such a system has the required strength and elongation to be installed on smooth or milled surfaces yet is easily milled and recycled owing to the uniquely engineered tensile and tear strengths of the fabric.

25 Claims, 1 Drawing Sheet

The disclosed paving fabric after milling on the left. Traditional paving fabric after millings, including a very large folded piece on the right.

(51) Int. Cl.
*D04H 13/00* (2006.01)
*C08L 95/00* (2006.01)
*C09D 163/00* (2006.01)

(52) U.S. Cl.
CPC ............ *E01C 7/185* (2013.01); *C09D 163/00* (2013.01); *D10B 2505/20* (2013.01)

(56) References Cited

U.S. PATENT DOCUMENTS

| | | | |
|---|---|---|---|
| 6,648,547 | B2 | 11/2003 | Jones et al. |
| 2002/0159837 | A1* | 10/2002 | Jones, IV ................ E01C 7/187 404/75 |
| 2003/0086762 | A1* | 5/2003 | Oka ...................... E01C 11/226 404/18 |
| 2013/0156501 | A1* | 6/2013 | Hemphill .............. E01C 11/005 404/75 |
| 2013/0175902 | A1* | 7/2013 | Abu Al-Rubb ........ H02N 2/181 310/339 |
| 2016/0273140 | A1† | 9/2016 | Wu |
| 2019/0169802 | A1* | 6/2019 | Dong ...................... E01C 7/325 |

FOREIGN PATENT DOCUMENTS

| | | |
|---|---|---|
| EP | 0457227 A1 | 11/1991 |
| FR | 2108145 A1 | 5/1972 |
| WO | 2016/062458 A1 | 4/2016 |

OTHER PUBLICATIONS

Petromat® Product Information Sheet, 6 pages, 2000.†
Petrotac® Pavement Repair Membrane, Installation Guidelines, 16 pages, Aug. 2006.†
TenCate Mirafi®, Mirafi® MTK Paving Fabric, Self-Adhering Waterproofing and Crack Relief Membrane, 2 pages, 2014.†

* cited by examiner
† cited by third party

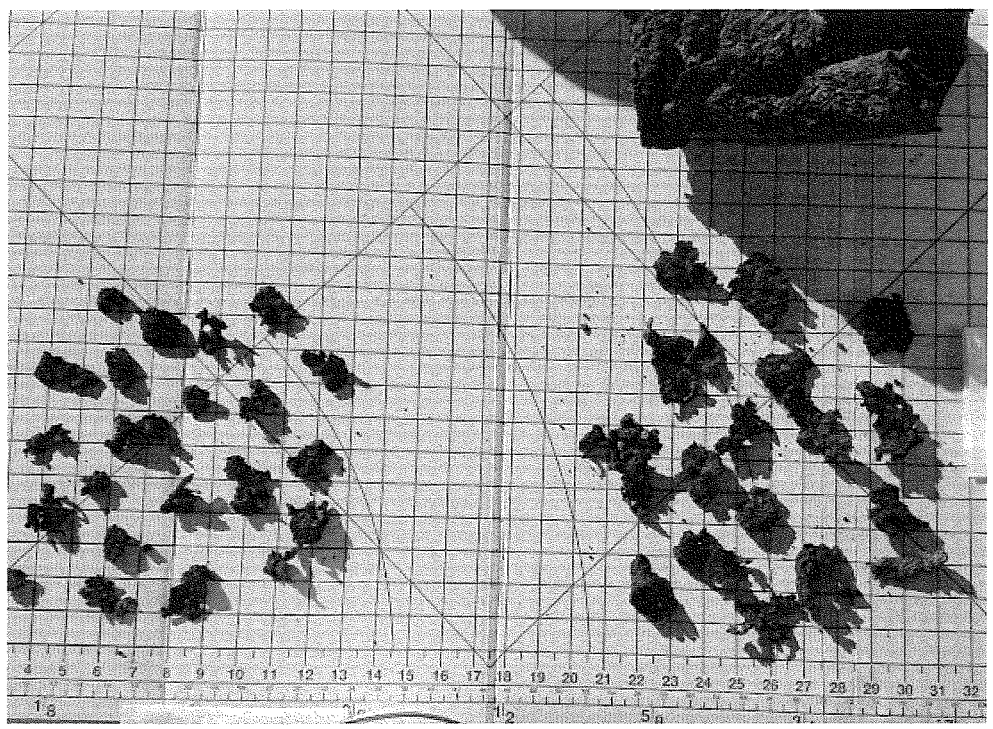
The disclosed paving fabric after milling on the left. Traditional paving fabric after millings, including a very large folded piece on the right.

MILLABLE, RECYCLABLE, WATERPROOFING, PAVING FABRIC INTERLAYER SYSTEM AND METHOD OF USE

CROSS-REFERENCE TO RELATED APPLICATIONS

This application claims benefit to provisional U.S. Patent Application No. 62/620,718, filed Jan. 23, 2018, whose disclosure is herein incorporated by reference in its entirety.

BACKGROUND

Trillions of dollars have been invested in our Nation's highway infrastructure. It is therefore vital to maintain and improve pavement performance to reduce the overall life-cycle costs of our roadway systems and to ensure the safety of motorists. Present-day pavements generally consist of asphalt, concrete, and/or composites thereof, which can be damaged for many reasons, including weather and traffic loading. The infiltration of water into a roadway is a major contributor to roadway damage because this weakens the base and subgrade support. Traffic loading is another contributor, which induces cracking in new and rehabilitated pavements.

Current highway repair programs have a few options for maintaining and preserving roadway pavements, however, these options suffer from significant shortcomings. The most common repairs are the placement of an additional new asphalt concrete overlay on the roadway or the milling and replacement of an existing overlay. Another repair strategy is the placement of a geosynthetic interlayer between new asphalt concrete layers or between an existing pavement and an asphalt concrete overlay or a chip seal surface treatment to extend the service life of the pavement.

The most widely used geosynthetic interlayer is a needle-punched nonwoven paving fabric made from thermoplastic staple fibers. These fabrics are combined in the field with an asphalt cement to form a thick interlayer to retard fatigue and reflective cracking in pavements and to act as a pavement moisture barrier. The paving fabric construction also makes it appropriate for use beneath a chip seal surface treatment by providing a durable fibrous seat for the chip seal surface treatment. A chip seal surface treatment involves the spraying of an asphalt emulsion onto the roadway surface, then immediately coating the surface with a layer of stone to build up pavement thickness, as opposed to placing a thickness of a plant-mixed asphalt concrete.

Although these measures can provide some relief, the pavements containing these paving fabric interlayers must eventually be resurfaced, and before resurfacing, a milling operation is frequently used to reduce the pavement thickness and to reestablish the correct pavement profile. Milling machines use large rotating drums with teeth to remove the top several inches of the existing pavement. Current paving fabric constructions are problematic because they can result in large pieces of the paving fabric that can wrap and clog milling drums so that milling operations are halted. Further, the millings containing the larger pieces of paving fabric, such as greater than 1.5 inches, can disrupt reprocessing operations and often render these millings unusable as a valuable asset for recycling back into new asphalt concrete.

Another existing option for roadway repair is the use of fiberglass or fiberglass composite geosynthetic interlayers within asphalt concrete pavements. These paving mats or composites were developed using brittle fiberglass fibers to create interlayers that are millable to recycle back into new asphalt concrete. Although easily milled and recycled, these fiberglass-based products have significant shortcomings that limit their effectiveness to extend pavement service life. Most of the fiberglass-based paving mats are very thin and, as such, cannot absorb a sufficient amount of stress from underlying cracking for long term prevention of fatigue and reflective cracking in the surface layer. Further, these thin fiberglass-based mats are unable to absorb and retain an adequate amount of asphalt cement to function as an effective moisture barrier. A pavement moisture barrier should have a water permeability of no more than $1 \times 10^{-4}$ cm/sec to effectively keep surface moisture from penetrating the pavement.

Additionally, working with the brittle fiberglass-based paving mats is quite difficult. The mats are easily damaged during installation and under construction traffic. Also, fiberglass-based paving mats readily tear and split open upon pavement cracking, which renders them ineffective as long-term moisture barriers. Due to the low elongation to rupture of fiberglass-based interlayers and their inability to stretch and bend, such products do not conform well to an uneven surface, such as a milled surface. A milled surface is the remaining corrugated pavement surface after cold milling, grinding, or planing a pavement surface with a milling machine. This milled surface is at least 15% longer than a flat pavement surface and these fiberglass-based pavement interlayers can elongate only 3 to 5% before rupturing. Thus, the use of fiberglass paving mats requires additional time, effort, and money to first prep the roadway surface before a repair is made. This initial prep commonly involves smoothing out the surface or placing an additional asphalt concrete layer to level the top of the surface. The fiberglass-based interlayers are also not appropriate for use beneath a chip seal surface treatment due to their thin nature and their vulnerability to construction and in-service damage.

One configuration for fiberglass-based interlayers is a composite of nonwoven fabric with a fiberglass grid or scrim. These products demonstrate strength principally in the machine and cross-machine directions and only a small fraction of their strength is demonstrated in any bias direction, such as at 45 degrees to the machine direction. This limits their ability to provide strength to resist pavement cracking due to traffic stresses applied in other than the machine or cross-machine orientations of the interlayers.

Moreover, the use of fiberglass paving mats can be injurious to workers as the fiberglass mats shed needle-like, glass fibers. This requires additional protective equipment and/or safeguards for workers engaged in the storage, handling, and installation of such materials. Still, workers coming in contact with these fiberglass paving mats complain of irritating glass fibers.

Milling and repaving of roadways has become very common-place and the ability of the geosynthetic interlayer to be easily milled and recycled into new asphalt concrete greatly influences the choice of product. It is therefore desirable to develop alternatives to overcome the shortcomings of existing geosynthetic interlayers for the repair, maintenance, and preservation of pavements. The present application is directed to an interlayer that is easily milled and recycled, like the fiberglass-based products, yet has all the features and benefits of a needle-punched, nonwoven thermoplastic paving fabric interlayer, such as thickness, asphalt cement absorption, elongation, 360 strength homogeneity, and durability. This application addresses the composition and method of use for a new geosynthetic interlayer fabric or composite system compatible with the current state of the practice in asphalt concrete paving and the placement of a chip seal surface treatment, and the subsequent milling and recycling of these pavements.

SUMMARY Provided herein is an easily millable, recyclable, waterproofing, paving fabric interlayer system comprising a flexible, nonwoven, paving fabric and a tack coat wherein the paving fabric includes (a) about 50-99% by weight of thermoplastic fibers having a length in the range of about 1-3 inches; and (b) an asphalt retention capacity between about 0.1-0.3 gallons/square yard.

This application is also directed to a method of waterproofing, repairing, or constructing a roadway or other hard surface that includes: (a) applying a tack coat onto the surface of the roadway; (b) placing a flexible, nonwoven, paving fabric interlayer onto the tack coat, wherein the paving fabric includes about 50-99% by weight of thermoplastic fibers having a length in the range of about 1-3 inches and an asphalt retention capacity between about 0.1-0.3 gallons/square yard, when tested per ASTM D6140; and (c) applying a new asphalt concrete layer or a chip seal surface treatment onto the paving fabric.

The present application is also directed to a millable, recyclable, waterproofing, paving fabric interlayer system made of a flexible, nonwoven, paving fabric and a tack coat wherein the fabric includes: (a) about 50-99% by weight of thermoplastic fibers having a length in the range of about 1-3 inches; (b) a strip tensile strength of about 40-50 pounds with an elongation of about 20 to 60% tested per ASTM test method D5035, Type 2C-E; (c) a grab tensile strength of about 75 to 100 pounds with an elongation of between about 30 and 70%, tested per ASTM D4632; (d) a thickness in the range of about 30-50 mils tested per ASTM D5199 and in the range of about 60-80 mils when asphalt saturated, when tested per ASTM D6140 and D5199; (e) a trap tear strength of about 30-45 pounds, when tested per ASTM D4533 and an asphalt saturated trap tear strength of 15-30 pounds when tested per ASTM 6140 and ASTM D4533; and (f) an asphalt retention capacity between about 0.1-0.3 gallons/square yard, tested per ASTM D6140.

Also, this application contemplates a millable, recyclable, waterproofing paving fabric conjoined with a scrim or grid and installed with an asphalt tack coat as an effective interlayer system.

In addition, the present application is directed to a prefabricated, millable, recyclable, waterproofing, paving fabric interlayer system made of a flexible, nonwoven, paving fabric including: (a) a mastic coating on at least one surface of the paving fabric; (b) about 50-99% by weight of thermoplastic fibers having a length in the range of about 1-3 inches; and (c) an asphalt retention capacity between about 0.1-0.3 gallons/square yard, when tested per ASTM D6140.

Also, the present application is directed to a composite of a layer or layers of sheet like material(s) composited with a millable, recyclable, waterproofing, paving fabric interlayer system made of a flexible, nonwoven, paving fabric including: (a) a mastic coating on at least one surface of the paving fabric; (b) about 50-99% by weight of thermoplastic fibers having a length in the range of about 1-3 inches; (c) a strip tensile strength of about 40-50 pounds with an elongation of about 20 to 60% tested per ASTM test method D5035, Type 2C-E; (d) a grab tensile strength of about 75 to 100 pounds with an elongation of between about 30 and 70%, tested per ASTM D4632; (e) a thickness in the range of about 30-50 mils tested per ASTM D5199; (f) a trap tear strength of about 30-45 pounds, when tested per ASTM D4533; (g) an asphalt saturated trap tear strength of about 15-30 pounds when tested per ASTM 6140 and ASTM D4533; and (h) an asphalt retention capacity between about 0.10 and 0.30 gallons/square yard, tested per ASTM D6140.

The millable, recyclable, waterproofing, paving fabric interlayer system and method of waterproofing, repairing, or constructing a roadway and other hard surface described herein have several benefits and advantages. One particular benefit is that the disclosed system provides an effective waterproofing moisture barrier, defined as having a permeability of no more than $1 \times 10^{-4}$ cm/sec for roadways. A disadvantage of thin fiberglass-based interlayers is that they cannot absorb enough asphalt cement to achieve sufficient waterproofing. Another benefit is that the disclosed system provides high elongation to rupture, as much as 70%, so that it can stretch over minor bumps, milled pavement surfaces, or undulations. In contrast, fiberglass products have a maximum elongation to rupture of only 3-5%. Placement directly onto a milled surface, a common cost-saving design configuration, requires at least 15% interlayer elongation. Therefore, the disclosed system offers a significant cost saving advantage over fiberglass-based interlayers. Elongation of the paving fabric system is necessary to maintain continuous moisture barrier integrity, even if the pavement in which it is embedded cracks open. Also, the disclosed system, when placed around a curve, can be stretched so as not to have to be cut and restarted several times, which is the case for the fiberglass paving mats. Cutting and restarting the fabric increases the complexity of installation and introduces additional seams thereby providing more chances for pavement overlay shoving and surface water ingress; and requires additional money, time, and effort to install properly. Another benefit of the disclosed system is that it provides excellent asphalt absorption/retention due to the thickness and needle-punched fibrous formation of the interlayer. Greater asphalt retention permits more stress absorption that better resists fatigue and reflective cracking in comparison to thinner fiberglass-based interlayers. Furthermore, thickness and asphalt retention of the paving fabric system provide a better seat for an overlying chip seal surface treatment to help minimize stone loss. An additional benefit of the disclosed system is that the light color of the interlayer reflects solar energy and remains cooler, which is not only beneficial for the workers but also for the hot tack coat to cool sufficiently and solidify properly to avoid paving equipment tracking and pick up. An extra benefit is that the disclosed system is easily millable and recyclable in subsequent roadway repairs owing to the fabric construction and the short length of the thermoplastic fibers therein, and the heat and pressure treatment, resulting in lower tensile and tear strengths and elongations. These features are unlike traditional AASHTO M 288 Type II paving fabric, which has longer fibers and a more entangled construction making it stretch and narrow-down to produce rope-like strands and large pieces, which can cause milling and recycling problems. In particular, the trapezoidal tear strength as tested on an in-service simulated asphalt saturated sample per ASTM D4533shows less than half the tear strength of the traditional paving fabric. Furthermore, the present fabric is better able to withstand and survive construction and in-service stresses without losing more than 10% of its original strength, in stark contrast to fiberglass-based fabrics that can degrade and weaken dramatically under such conditions.

BRIEF DESCRIPTION OF THE DRAWING

FIG. 1 is a photo illustrating the size of the disclosed paving mat particles after milling in comparison to particles of a different type of commercially available product after milling.

DETAILED DESCRIPTION

Provided herein is a method of waterproofing, repairing, or constructing a roadway or other hard surfaces that includes applying a tack coat onto the roadway, placing a flexible, nonwoven, paving fabric onto the tack coat, and applying an asphalt concrete overlay or a chip seal surface treatment onto the paving fabric. The method can optionally include an initial step of milling or otherwise preparing the roadway or surface prior to the application of the tack coat.

The tack coat can be an asphalt cement compound, an emulsion, an asphalt emulsion, or any other sticky or tacky material. In one embodiment, the tack coat, which can be a hot liquid asphalt cement, is applied to the pavement surface, then the paving fabric is applied onto the tack coat. Upon placement of the asphalt concrete overlay or by rolling the installed fabric prior to a chip seal surface treatment placement, the asphalt tack coat saturates up into and through the paving fabric to bond it to the existing pavement and overlay pavement. Uncut paving grade asphalt cements (AC, AR or penetration grades PG) can be used as the tack coat material. The most commonly used are AC-20, AR-4000, and PG 64-22. The actual grade of asphalt cement to be used will depend on the geographic area of the installation and the season of the year. Also, other adhesive compounds can be used as a coating or coatings in addition to or instead of asphalt, such, as a modified asphalt, a rubber-modified asphalt, a polymer-modified asphalt, an acrylic, a polyvinyl alcohol, a vinyl ester, an epoxy, a polyacrylate, a polyurethane, a phenolic, and mixtures thereof.

Anionic or cationic asphalt emulsions (RS or CRS grades) can be used; however, these emulsions contain up to 50% water, which must dry before fabric placement. These emulsions have low viscosity allowing them to run to low areas quickly, resulting in uneven applications, especially on milled surfaces. Cutback asphalts (RC, MC and SC grades) or emulsions containing oil distillates should not be used for the tack coat. These cutback materials contain solvents that can lead to instability of the thermoplastic fibers of the interlayer paving fabric.

It is desirable to uniformly apply the tack coat to enable the interlayer fabric to become completely saturated with asphalt to provide its full waterproofing benefit. An asphalt distributor truck can be used to provide a uniform tack coat application. The height of the spray bar and spray nozzles can be adjusted to attain the correct spray width and overlap. If there is not room on the site to move a distributor truck, the tack coat can be placed by hand spray or a squeegee.

The actual amount of tack coat on the pavement surface should be measured. This can be calculated based on the change in weight of the distributor truck, change in level gauge, on-board computer or other reliable metering system. A heavy cardboard or wood paneling coupon, such as 1 foot×1 foot or 1 yard×1 yard, may be weighed and placed before tack application. It should then be picked up and weighed again to determine that the proper tack amount was applied.

The tack coat should be applied as the interlayer fabric width plus 3". Also, tack coat should be applied between all fabric overlaps. End-of-roll overlaps trimmed to 1" do not need a second tack coat. A tack coat application rate of 0.2-0.3 gallon per square yard is suggested with the interlayer fabric under most conditions when using an uncut paving grade asphalt tack coat. In one embodiment, an application rate of 0.25 gallon per square yard can be used to saturate the interlayer fabric and bond it to pavement surfaces.

The paving fabric that is to be placed on top of the tack coat is a nonwoven fabric of about 50-99% by weight of thermoplastic fibers, such as polyester, polypropylene, polyethylene, polyvinyl chloride, polystyrene, polycarbonate, derivatives thereof, and mixtures thereof. In one embodiment, the thermoplastic fibers are polypropylene. The length of the fibers is in the range of about 1-3 inches. The paving fabric or fibers that comprise the paving fabric can further include an additive such as a clay, a natural or synthetic rubber, a reinforcing agent, a filler, a resin, a softener, an extender, a vulcanization agent, a plasticizer, a pigment, and mixtures thereof.

The paving fabric further can include a small amount of a filament glass fiber, a polyamide fiber, or another stiff fiber. These additive are present generally at less than about 50% by weight. In addition, a scrim or grid can be conjoined as a layer placed on the roadway or other hard surface as a composite with the interlayer paving fabric. The scrim or grid can be made from a thermoplastic polymer or any other fiber, including fiberglass, Kevlar, polyamide, polyvinyl alcohol, derivatives thereof, and mixtures thereof.

One side of the interlayer fabric is heat-set, or fused, under pressure to create a smooth surface. This heat-set side increases the modulus and stiffness of the fabric and reduces bleed-through of the asphalt tack coat and helps prevent fabric pick-up by trucks during hot weather installation. The other side of the disclosed product is constructed with a fuzzy surface to be placed onto the asphalt tack coat to enhance bonding. The unique heat and pressure treatment also helps engineer the ability of the fabric to tear into small pieces during milling and recycling operations. The interlayer fabric described herein has a tight, needle-punched, nonwoven structure that absorbs and retains the asphalt tack coat to provide a durable, stable waterproofing membrane.

Although the paving fabric can be of any color, a light-colored paving fabric provides the benefit of solar reflection and lack of heat absorption from the sun. The cooler temperature of the fabric, which may be up to around 50 degrees F. cooler, helps to keep workers comfortable, ensures that the tack coat sets properly, and prevents equipment tracking and fabric pick up. The paving fabric can also be a white-colored paving fabric. The light reflective color also enhances the safety and visibility of night-time paving operations.

The paving fabric has a strip tensile strength of about 40-50 pounds with an elongation of about 20 to 60% tested per ASTM test method D5035, Type 2C-E; and a grab tensile strength of about 75 to 100 pounds with an elongation of between about 30 and 70%, tested per ASTM D4632; a thickness in the range of about 30-50 mils tested per ASTM D5199 and in the range of about 60-80 mils when asphalt saturated, per ASTM D6140 and D5199; a trap tear strength of about 30-45 pounds, tested per ASTM D4533 and an asphalt saturated trap tear strength of about 15-30 pounds when tested per ASTM 6140 and ASTM D4533; and an asphalt retention capacity of about 0.1-0.3 gallons/square yard. These unique physical properties of the fabric make it strong enough to survive installation stresses yet not too strong to prevent efficient milling and recycling.

A specially equipped tractor or distributor truck can be used to place the paving fabric. This equipment has attachments to lay down and broom in the paving fabric and apply uniform tension as the laydown operation proceeds. The equipment should have a roll brake at each end of the fabric boom to prevent uncontrolled unrolling of the paving fabric. The brake tension should be adjusted evenly to limit wrinkling of the fabric. The laydown equipment will often have brooms attached to smooth out the fabric as it is laid. The brooms should be in good condition. The laydown equipment may also have a tension bar to apply the paving fabric smoothly and keep wind from rolling up the edges of the fabric as it is laid. The tension bar can often be adjusted as needed to smooth out the paving fabric. Good results may be obtained if this bar is bowed out. If necessary, the interlayer fabric can be installed by hand. In this case, a pipe is inserted through the core of the roll and hand brakes at each end are used to apply tension to the fabric during the placement procedure. The fabric is specially made with a fuzzy inside of the roll, which is placed down onto the tack coat.

The present application is also directed to a millable, recyclable, waterproofing paving fabric described in the previous paragraphs that is conjoined with a scrim or grid and installed with an asphalt tack coat to become an interlayer system. The material comprising the scrim or grid can be thermoplastic or strands of a glass fiber, a polyamide, Kevlar, polyvinyl alcohol, or other stiff fiber or extruded bands.

Another embodiment of the present application is a prefabricated, millable, recyclable, waterproofing, paving fabric interlayer system comprising a flexible, nonwoven, paving fabric and a tack coat applied to the fabric before installation on at least one surface of the paving fabric, wherein the paving fabric comprises about 50-99% by weight of thermoplastic fibers having a length in the range of about 1-3 inches; a strip tensile strength of about 40-50 pounds with an elongation of about 20 to 60% when tested per ASTM test method D5035, Type 2C-E; and a grab tensile strength of about 75 to 100 pounds with an elongation of between about 30 and 70%, tested per ASTM D4632; a thickness in the range of about 30-50 mils tested per ASTM D5199 and in the range of about 60-80 mils when asphalt saturated, per ASTM D6140 and D5199; a trap tear strength of about 30-45 pounds, when tested per ASTM D4533 and an asphalt saturated trap tear strength of about 15-30 pounds when tested per ASTM 6140 and ASTM D4533; and an asphalt retention capacity of at about 0.1-0.3 gallons/square yard. The factory pre-applied mastic coating can be self-adhering and helps to anchor the paving fabric composite during the roadway application process and adds to the effect of the tack coat. A new asphalt concrete overlay or a chip seal surface treatment can be placed onto the prefabricated composite system product.

The thermoplastic fibers of the prefabricated composite system can be polyester, polypropylene, polyethylene, polyvinyl chloride, polystyrene, polycarbonate, polyamide, derivatives thereof, or mixtures thereof. In one embodiment, the thermoplastic fibers are polypropylene. The paving fabric can further include a filament glass fiber, a polyamide fiber, Kevlar, polyvinyl alcohol, or other stiff fiber can be added to the paving fabric in addition to the thermoplastic fibers.

The mastic coating can be a rubberized, self-adhering, asphalt cement compound or any other self-adhering compound. In addition, other adhesive compounds can be used as a coating or coatings in addition to or instead of asphalt, such as rubber-modified asphalt, a polymer-modified asphalt, an acrylic, a polyvinyl alcohol, a vinyl ester, an epoxy, a polyacrylate, a polyurethane, a phenolic, and mixtures thereof.

The prefabricated composite system can contain additional materials and coatings as well. In one embodiment, an anionic or cationic emulsion can be added to the system. In another embodiment, an additive such as a clay, a natural or synthetic rubber, a reinforcing agent, a filler, a resin, a softener, an extender, a vulcanization agent, a plasticizer, a pigment, or mixtures thereof can be added. In one embodiment, the top surface of the fabric, away from the mastic coated side, is coated with an asphaltic material to facilitate installation.

The prefabricated composite system can further include a scrim or grid conjoined with the paving fabric. The scrim or grid can be made from a thermoplastic polymer, fiberglass, or other material having some degree of stiffness.

Although the paving fabric can be of any color, a light-colored paving fabric provides the benefit of solar reflection and lack of heat absorption from the sun. The cooler temperature of the fabric, which may be up to around 50 degrees F. cooler, helps to keep workers comfortable, ensures that the tack coat sets properly, and prevents equipment tracking and potential fabric pick up. The paving fabric can also be a white paving fabric. The light reflective color also enhances the safety and visibility of night-time paving operations.

EXAMPLES

The following non-limiting examples are provided to further illustrate the present disclosure.

Example 1: Construction and Installation Requirements

This installation requires placing a millable, recyclable, waterproofing, paving fabric interlayer beneath a pavement overlay, beneath a chip seal surface treatment, or between pavement layers; to provide an effective and durable moisture barrier having substantial elongation to rupture, high stress absorption, significant asphalt retention capacity, wrinkle resistance, a relatively cool temperature, and excellent night visibility due to its light color.

Paving Fabric: The paving fabric will be a staple fiber, needle-punched, nonwoven material consisting of about 50-99% by weight polyolefins, polyesters, or polyamides, fibers that are 1 to 3 inches in length. The paving fabric shall be resistant to chemical attack, rot, and mildew and shall have no tears or defects that will adversely alter its physical properties. The fabric shall be heat-set on one side to reduce tack coat bleed-through and to minimize fabric pickup by construction equipment during installation. The fabric shall meet the physical requirements specified in Table 1, which satisfies the strength requirement for a paving fabric Type I as recommended in AASHTO M 288, national guideline specifications. However, the disclosed product will exceed the specified 5% maximum elongation in order to be compatible with placement onto a milled surface and to facilitate installation.

Tack Coat: The tack coat used to impregnate the fabric and bond the fabric to the pavement is typically the same grade asphalt cement as used in the hot mix asphalt. A cationic or anionic emulsion may be used if needed.

Weather Limitations: The air and pavement temperatures shall be at least 50° F. (10° C.) and rising for placement of asphalt cement and shall be at least 60° F. (16° C.) and rising for placement of asphalt emulsion. Neither asphalt tack coat nor paving fabric shall be placed when weather conditions are not suitable.

Surface Preparation: The pavement surface shall be dry and thoroughly cleaned of all dirt and oil. Cracks ⅛ inch (3 mm) wide or greater shall be cleaned and filled with suitable bituminous material. Crack-filling material shall be allowed to cure prior to placement of paving fabric. Potholes and other pavement distresses shall be repaired. A milled surface is acceptable.

Tack Coat Application: The tack coat shall be applied using a calibrated distributor truck spray bar. Hand spraying, squeegee, and brush application may be used in locations where the distributor truck cannot reach. The tack coat shall be applied uniformly to the prepared, clean, dry pavement surface. The tack coat application rate must be sufficient to saturate the fabric and to bond the fabric to the existing pavement surface. The tack coat application rate shall be 0.22 to 0.28 gallons per square yard (1.0 to 1.3 liters per square meter) as required by the roadway surface and environmental conditions. When using emulsions, the application rate must be increased to offset the water content of the emulsion. Within street intersections, on steep grades, or in other zones where vehicle braking is common, the normal application rate shall be reduced by about 20 percent, but to not less than 0.20 gallons per square yard (0.9 liters per square meter).

The temperature of the tack coat shall be sufficiently high to permit a uniform spray pattern. For asphalt cements, the minimum temperature shall be 290° F. (143° C.). To avoid damage to fabric, distributor tank temperatures shall not exceed 325° F. (163° C.). For asphalt emulsions, the distributor tank temperatures shall be maintained between 130° F. (55° C.) and 160° F. (71° C.).

The target width of the tack coat application shall be equal to the paving fabric width plus 3 inches (76 mm). Tack coat application shall be wide enough to cover the entire width of fabric overlaps. The tack coat shall be applied only as far in advance of paving fabric installation as is appropriate to ensure a tacky surface at the time of paving fabric placement. Traffic shall not be allowed on the tack coat. Excess tack coat shall be cleaned from the pavement.

Paving Fabric Placement: The paving fabric shall be placed onto the tack coat using mechanical or manual laydown equipment capable of providing a smooth installation with a minimum amount of wrinkling or folding. The paving fabric shall be placed before the asphalt cement tack coat cools and loses its tackiness. Paving fabric shall not be installed in areas where the overlay asphalt tapers to a minimum compacted thickness of less than 1.5" (3.8 cm).

When asphalt emulsions are used, the emulsion shall be allowed to cure properly such that essentially no water moisture remains prior to placing the paving fabric. Wrinkles severe enough to cause folds shall be slit and laid flat. Brooming and/or rubber-tire rolling will be required to maximize paving fabric contact with the pavement surface. Additional hand-placed tack coat may be required at overlaps and repairs.

Turning of the paver and other vehicles shall be done gradually and kept to a minimum to avoid movement and damage to the paving fabric. Abrupt starts and stops shall also be avoided. Damaged fabric shall be removed and replaced with same type of fabric and a tack coat.

Joints and Overlaps: At joints, fabric rolls shall overlap by 1 inch to 6 inches (2.5 to 15.2 cm). End joints and joints from repair of wrinkles should be made to overlap or "shingle" in the direction that the pavement overlay will be placed. Overlaps of adjacent rolls may be as great as 6 inches to accommodate variations between the width of the roadway and paving fabric. Excess fabric shall be cut and removed to ensure that overlaps of adjacent rolls do not exceed 6 inches (152 mm). Additional tack coat shall be applied between all fabric overlaps. Any locations that do not have additional tack for the overlaps shall be corrected by manual placement of tack coat prior to overlay construction. No traffic except necessary construction traffic will be allowed to drive on the paving fabric.

Overlay Placement: Asphalt concrete overlay construction shall closely follow fabric placement. All areas in which paving fabric has been placed should be paved during the same day as fabric installation. Excess tack coat that bleeds through the paving fabric shall be blotted by broadcasting sand on the paving fabric. Excess sand should be removed before beginning the paving operation. In the event of rainfall on the paving fabric prior to the placement of the asphalt overlay, the paving fabric must be allowed to dry before asphalt concrete is placed. Overlay asphalt thickness shall meet the requirements for the contract drawings and documents. The minimum compacted thickness of overlay asphalt shall not be less than 1.5 inches (3.8 cm) in areas of paving fabric installation. An alternative driving surface applied over the disclosed paving fabric is a chip seal surface treatment. This system requires rolling of the installed paving fabric system to ensure saturation and bonding before chip seal surface treatment placement.

TABLE 1

| | | INDEPENDENT LAB TESTING OF INTERLAYERS | | | | |
|---|---|---|---|---|---|---|
| Properties | Test Method | Fabric 1 | Fabric 2 | Fabric 3 | Fabric 4 | Fabric 5 |
| Mass per unit Area | ASTM D 3776 | 5.0 oz/yd$^2$ | 5.1 oz/yd$^2$ | 4.2 oz/yd$^2$ | 4.6 oz/yd$^2$ | 4.7 oz/yd$^2$ |
| Grab Tensile Strength | ASTM D 4632 | 90 lbs. | 116 lbs. | 64 lbs. | 95 lbs. | 92 lbs. |
| Grab Tensile Elongation | ASTM D 4632 | 41% | 82% | 2% | 2% | 2% |
| Asphalt Retention | ASTM D 6140 | 0.21 gal/yd$^2$ | 0.32 gal/yd$^2$ | 0.23 gal/yd$^2$ | 0.08 gal/yd$^2$ | 0.14 gal/yd$^2$ |
| Asphalt saturated Trap Tear | ASTM D 6140 and D 4533 | 22 lbs. | 56 lbs. | 7 lbs. | 24 lbs. | 101 lbs. |
| Thickness | ASTM D 5199 | 34 mils | 47 mils | 43 mils | 20 mils | 31 mils |

TABLE 1-continued

INDEPENDENT LAB TESTING OF INTERLAYERS

| Properties | Test Method | Fabric 1 | Fabric 2 | Fabric 3 | Fabric 4 | Fabric 5 |
|---|---|---|---|---|---|---|
| Asphalt Saturated Thickness | ASTM D 6140 and D 5199 | 70 mils | 90 mils | 50 mils | 24 mils | 49 mils |
| Strip tensile strength MD or CMD | ASTM D 5035, Type 2C-E | 49 lbs. | 83 lbs. | 72 lbs. | 181 lbs. | 102 lbs. |
| Elongation | ASTM D 5035, Type 2C-E | 28% | 62% | 2% | 2% | 2% |
| Strip Tensile Strength 45° Bias | ASTM D 5035, Type 2C-E | 48 lbs. | 86 lbs. | 70 lbs. | 34 lbs. | 16 lbs. |

Fabric 1 is the millable, recyclable, waterproofing, paving fabric interlayer of the present application.
Fabric 2 is Petromat® Style 4598 manufactured by Propex Operating Company, LLC, a traditional nonwoven, needle-punched thermoplastic paving fabric.
Fabric 3 is a fiberglass mat with a polymer binder.
Fabric 4 is a composite with a fiberglass reinforcing scrim between two thin nonwoven fabrics.
Fabric 5 is a nonwoven fabric conjoined to a fiberglass grid.

All numerical values represent average roll values in the weaker principal direction when tested per ASTM D8102. Lots were sampled according to ASTM D 4354-89, "Practice for Sampling of Geosynthetics for Testing."

FIG. 1 is a side-by-side comparison of representative pieces of asphalt saturated paving fabric taken after milling the asphalt concrete pavements in which they were embedded. The paving fabric disclosed herein is on the left and milling resulted in pieces less than 1.5 inches and manageable for reprocessing into new asphalt concrete. The pieces on the right are from a traditional needle-punched, staple fiber, thermoplastic paving fabric where the same milling operation resulted in significantly larger pieces, including a very large piece shown on top; rendering the millings containing these larger pieces as waste, and not usable for reprocessing. The very large pieces also can cause problems for the milling operation.

TABLE 2

TRAFFIC DAMAGE TO GEOSYNTHETIC PAVEMENT INTERLAYERS

| Product | Test Method and Units | Control Sample MD | Trafficked Sample MD | Control Sample CMD | Trafficked Sample CMD | Strength Retained MD (%) | Strength Retained CMD (%) |
|---|---|---|---|---|---|---|---|
| Disclosed Paving Fabric | ASTM D4632 lbs. | 100.0 | 97.6 | 100.0 | 97.9 | 98% | 98% |
| Fiberglass Paving Mat | ASTM D5035 lbs. | 41.2 | 13.8 | 37.0 | 21.7 | 33% | 59% |

Note:
Both fabrics exposed to ten passes of a passenger car for trafficked samples.

Table 2 shows the difference in durability between the disclosed product and a fiberglass-based product. Just light trafficking, such as rolling over the fabrics with a car, reduced the strength of the brittle fiberglass product by 50 percent. These results demonstrate the durability advantage of the needle-punched thermoplastic paving fabric disclosed herein as compared to a commercially available fiberglass product, which is fiberglass with a polyester binder paving mat. The thermoplastic fabric experiences almost no impact due to ten passes of a car while this light trafficking demonstrates one shortcoming of the fiberglass-based product—a dramatic reduction in strength under traffic loading. This test simulates installation stresses imposed on these products.

Various changes, such as lighter or heavier weight versions using the same fabric construction, could be made in the above products and methods without departing from the scope of the disclosure. It is intended that all matter contained in the above description shall be interpreted as illustrative and not in a limiting sense.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

What is claimed is:

1. A millable, recyclable, waterproofing, paving fabric interlayer system comprising a flexible, nonwoven, paving fabric and a tack coat wherein the paving fabric includes: (a) about 50-99% by weight of thermoplastic fibers having a length in the range of about 1-3 inches; and (b) an asphalt retention capacity of about 0.1-0.3 gallons/square yard, wherein the fabric is heat and pressure treated resulting in a fabric comprising one heat set, smooth surface.

2. The system of claim 1 wherein the tack coat comprises an asphalt cement compound or an emulsion.

3. The system of claim 1 wherein the thermoplastic fibers are selected from the group of polyester, polypropylene, polyethylene, polyvinyl chloride, polystyrene, polycarbonate, polyamide, derivatives thereof, and mixtures thereof.

4. The system of claim 1 wherein the fabric comprises a strip tensile strength of about 40-50 pounds with an elongation of about 20-60%, when tested per ASTM D5035 Type 2C-E.

5. The system of claim 1 wherein the fabric comprises a grab tensile strength of about 75-100 pounds with an elongation of about 30-70%, when tested per ASTM D4632.

6. The system of claim 1 wherein the fabric comprises a thickness in the range of about 30-50 mils, when tested per ASTM D5 1 99 and a thickness in the range of 60-80 mils when asphalt saturated, per ASTM D6140 and D5199.

7. The system of claim 1 wherein the fabric comprises a trap tear strength of about 30-45 pounds, when tested per ASTM D4533 and an asphalt saturated trap tear strength of about 15-30 pounds when tested per ASTM 6140 and ASTM D4533.

8. The system of claim 1 wherein the fabric comprises a light-colored, solar reflective fabric.

9. The system of claim 1 wherein the fabric further comprises an additive selected from the group consisting of a clay, a natural or synthetic rubber, a reinforcing agent, a filler, a resin, a softener, an extender, a vulcanization agent, a plasticizer, a pigment, and mixtures thereof.

10. The system of claim 1 wherein the fabric further comprises a filament glass fiber, a polyamide fiber, Kevlar, polyvinyl alcohol, or mixtures thereof.

11. The system of claim 1 further comprising a scrim or grid conjoined with the fabric.

12. The system of claim 1 further comprising a coating or coatings of a material selected from the group consisting of an asphalt, a modified asphalt, an acrylic, a polyvinyl alcohol, a vinyl ester, an epoxy, a polyacrylate, a polyurethane, a phenolic, an asphalt emulsion, and mixtures thereof.

13. A prefabricated, recyclable, waterproofing, paving fabric interlayer system comprising a flexible, nonwoven, paving fabric and a tack coat applied to the fabric before installation, wherein the fabric comprises:
   (a) a mastic coating on at least one surface of the paving fabric;
   (b) about 50-99% by weight of thermoplastic fibers having a length in the range of about 1-3 inches; and
   (c) an asphalt retention capacity of about 0.1 and 0.3 gallons/square yard when tested per ASTMD6140, wherein the fabric is heat and pressure treated resulting in a fabric comprising one heat set, smooth surface.

14. The system of claim 13 wherein the fabric comprises a strip tensile strength of about 40-50 pounds/inch with an elongation of about 20-60% when tested per ASTM method D5035.

15. The system of claim 13 wherein the fabric comprises a grab tensile strength of about 75-100 pounds with an elongation of about 30-70%, when tested per ASTM D4632.

16. The system of claim 13 wherein the fabric comprises a thickness in the range of about 30-50 mils when tested per ASTM 5199 and in the range of about 60-80 mils when asphalt saturated, per ASTM D6140 and D5199.

17. The system of claim 13 wherein the fabric comprises a trap tear strength of about 30-45 lbs., when tested per ASTM D4533 and an asphalt saturated trap tear strength of about 15-30 pounds when tested per ASTM 6140 and ASTM D4533.

18. The system of claim 13 wherein the thermoplastic fibers are selected from the group polyester, polypropylene, polyethylene, polyvinyl chloride, polystyrene, polycarbonate, polyamide, derivatives thereof, and mixtures thereof.

19. The system of claim 13 wherein the mastic coat comprises a material selected from the group consisting of an asphalt, a rubber-modified asphalt, a polymer-modified asphalt, an acrylic, a polyvinyl alcohol, a vinyl ester, an epoxy, a polyacrylate, a polyurethane, a phenolic, and mixtures thereof.

20. The system of claim 13 wherein the fabric comprises a light-colored, solar reflective fabric.

21. The system of claim 13 further comprising an additive selected from the group consisting of a clay, a natural or synthetic rubber, a reinforcing agent, a filler, a resin, a softener, an extender, a vulcanization agent, a plasticizer, a pigment, and mixtures thereof.

22. The system of claim 13 wherein the paving fabric further comprises a filament glass fiber, a polyamide fiber, Kevlar, polyvinyl alcohol, or another stiff fiber.

23. The system of claim 13 further comprising a scrim or grid conjoined with the fabric.

24. The system of claim 23 wherein the scrim or grid comprises a thermoplastic polymer or fiberglass.

25. The system of claim 13 further comprising a coating or coatings of a material selected from the group consisting of an asphalt, a rubber-modified asphalt, a polymer-modified asphalt, an acrylic, a polyvinyl alcohol, a vinyl ester, an epoxy, a polyacrylate, a polyurethane, a phenolic, and mixtures thereof conjoined with the fabric.

* * * * *